United States Patent Office 3,364,074
Patented Jan. 16, 1968

3,364,074
SIMULTANEOUS CATALYSIS AND WETPROOFING OF CARBON-CONTAINING ELECTRODES AND ELECTRODE PRODUCED THEREBY
Karl V. Kordesch, Lakewood, Ohio, assignor to Union Carbide Corporation, a corporation of New York
No Drawing. Filed Sept. 3, 1964, Ser. No. 394,339
6 Claims. (Cl. 136—122)

This application relates to carbon-containing electrodes. More particularly, the invention is directed to a process for simultaneously wetproofing and catalyzing such electrodes, particularly electrodes for use in fuel cells.

Carbon-containing electrodes and various techniques for catalyzing or wetproofing them have been known for some time. However, separate catalyzation and wetproofing steps have been subject to several disadvantages, for example, the necessity of multiple process steps and relatively long break-in periods for the finished electrode.

It is an object of this invention to provide a process for simultaneously catalyzing and wetproofing carbon-containing electrodes. A further object of the invention is to provide an improved catalyzed and wetproofed electrode for use in fuel cells which has a shorter break-in period than electrodes heretofore known. A still further object of the invention is to provide a process for catalyzing and wetproofing carbon-containing electrodes which can be carried out at relatively low temperatures. These and other objects and advantages of the invention will be apparent from the following description and appended claims.

The process of this invention comprises the steps of (1) contacting a carbon-containing electrode with an organic solvent solution containing (a) a wetproofing agent for the electrode and (b) a compound of the formula "A"

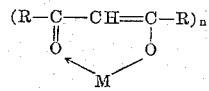

and (2) thereafter heating the electrode at a temperature sufficiently high to decompose the compound of Formula A.

In Formula A above, M represents platinum, palladium, rhodium or iridium, R represents a monovalent hydrocarbon group, and $n$ is an integer equal to the electrovalence of M. In general, $n$ is 2 for platinum and palladium, and $n$ is 3 for rhodium and iridium. The compounds of Formula A are generally referred to as noble metal acetylacetonates.

The R groups in Formula A can be the same or different throughout the same molecule and can be alkyl, aryl, alkaryl, aralkyl, alkenyl, alkynyl, cycloalkyl, cycloalkenyl, and the like groups. For example, R can be methyl, ethyl, n-butyl, tertiary-butyl, 2,2-dimethyl-n-propyl, iso-octyl, decyl, phenyl, phenylethyl, cumyl, mesityl, cyclopentyl, ethylcyclohexenyl, allyl, or butyne-2-yl groups, and the like. R groups free of aliphatic unsaturation are generally preferred. Preferably the R groups each contain from 1 to about 10 carbon atoms.

Illustrative compounds of Formula A are those having the following formulas:

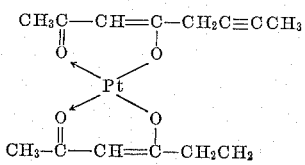

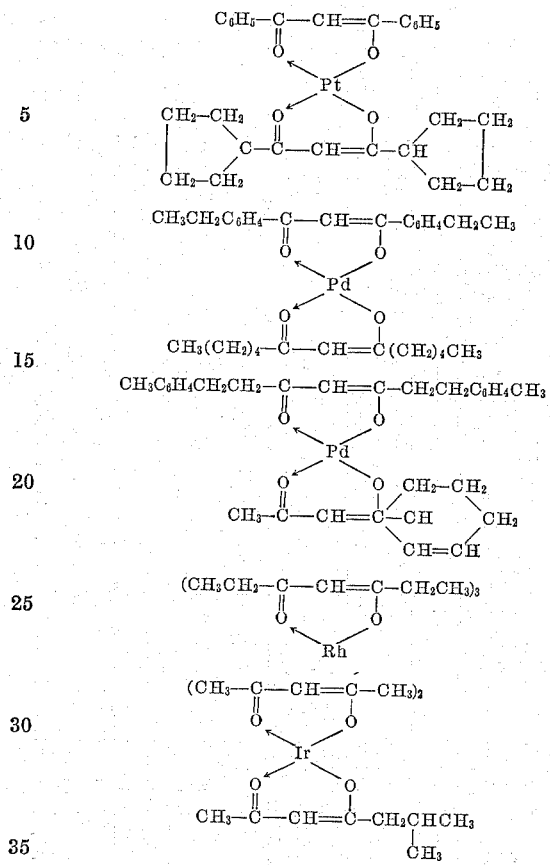

In the above formulas $C_6H_5$ and $C_6H_4$ represent the phenyl group and phenylene group, respectively.

The compounds of Formula A are known and can be prepared by conventional methods. See, for example, N. V. Sidgwick "Chemical Elements And Their Compounds," Oxford Univ. Press, 1950, pp. 1567 and 1599; Chemical Abstracts 47, 11060 g; Dwyer et al., J. Am. Chem. Soc. 75, 984 (1953); and Fay et al., J. Am. Chem. Soc. 84, 2303 (1962). The methods of the references are based on the reaction of a salt of the metal M with a diketone of the formula

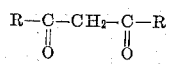

where R has the meaning defined hereinabove.

Compounds in which two or three ligands bonded to the metal M are different can be prepared from mixtures of the appropriate diketones.

Any organic solvent can be employed in the process of this invention so long as both the wetproofing agent and the compound of Formula A are soluble therein. Illustrative operable solvents include hydrocarbons such as petroleum ether, cyclohexane, 2-ethylhexane, kerosene, benzene, toluene, xylene and the like; halogenated hydrocarbons such as chloroform, symmetrical tetrachloroethane, chlorobenzene, bromoform, and the like; alcohols such as butanol, isohexanol, decanol, benzyl alcohol, propylene glycol, butylene glycol, glycerol, and the like; ketones such as acetone, methylbutylketone, acetophenone, and the like; and ethers such as diethyl ether, di-isopropyl ether, methylbutyl ether, dioxane, tetrahydrofuran, ethylene glycol dimethyl ether, diethylene glycol dimethyl ether, and the like. Mixtures of two or more of these solvents are also operable. The solvents most preferred are those which are volatile at temperatures below about 200° C., either at atmospheric pressure or at easily obtainable reduced pressures down to about 0.1 atmosphere.

The carbon-containing electrodes useful in this invention can be substantially pure carbon, such as graphite or activated porous carbon, or the electrode can be a mixture of carbon with a metal such as nickel or iron, a mixture of carbon with a plastic such as polyethylene or polytetrafluoroethylene, a mixture of carbon with both a metal and a plastic, carbon with a metal backing, and the like.

Suitable wetproofing agents for carbon-containing electrodes, particularly fuel cell electrodes, are known in the art. Illustrative wetproofing agents include, for example, paraffin oils, paraffin waxes, halogenated paraffin oils, halogenated paraffin waxes, low molecular weight polyolefins such as polyethylene and polypropylene, aliphatic monohydroxy alcohols containing between about 8 and about 18 carbon atoms and the glycols having molecular weights between about 2000 and about 4000, such as polypropylene glycol and polybutylene glycol, halogenated naphthalenes, perfluorochloroethylenes, and the like.

The proportions of wetproofing agent and compound of Formula A which are dissolved in the organic solvent are not critical. It is preferable, however, to have the wetproofing agent present in an amount about one and three weight percent based on the weight of the solvent. It is also preferable to have the compound of Formula A present in sufficient concentration to provide between about 0.2 and about 5.0 milligrams of metal M per square centimeter of electrode surface.

The carbon-containing electrode and the solution containing the wetproofing agent and compound of Formula A can be contacted by any convenient method, such as spraying or brushing of the solution on the electrode surface, or preferably by immersing the electrode in the solution for 5 to 10 minutes or longer.

After contact with the solution of wetproofing agent and the compound of Formula A, the electrode is heated at a temperature sufficiently high to decompose the compound of Formula A to the elemental metal M. The compounds of Formula A in contact with the carbon-containing electrode generally decompose at temperatures below about 200° C., and where the metal is platinum or palladium a preferred temperature for heating the treated electrode is 100° to 150° C. The heating step can be carried out by any convenient means such as heating in vacuum, in air, in an inert atmosphere, or heating by means of a stream of warm gas. The heating time should be sufficient to substantially completely decompose the compound of Formula A to the elemental metal and will vary somewhat depending upon the particular compound employed and the temperature. In general, heating times in the order of one to 16 hours are satisfactory.

The process of the present invention has several advantages over methods heretofore known. One advantage is that the compounds of Formula A decompose substantially completely at relatively low temperatures, and the electrodes treated by the process of this invention are therefore free from undecomposed catalyst composition which may later be leached into the fuel cell electrolyte.

A further advantage which results from the low decomposition temperatures mentioned hereinabove is that very thin electrodes, particularly thin carbon-plastic electrodes in which the carbon particles are bonded with high molecular weight polyethylene, can be catalyzed without heating to temperatures above about 120° C., since higher temperatures have been known to damage such electrodes.

An additional advantage is that highly uniform distribution of the catalyst metal over the electrode surface is obtained by the process of this invention.

It is well known in the art that hydrophobic carbon-containing fuel cell electrodes require a break-in period (period of operation at low current density) after catalyzation and wetproofing in order to establish a conductive (low resistance) interface between the electrode surface and the electrolyte. Where electrodes are catalyzed and waterproofed by the process of the present invention, the break-in period for conventional carbon-containing fuel cell electrodes is in the order of about one to 3 hours. Where similar fuel cell electrodes are first catalyzed and then wetproofed in separate steps, the typical break-in period is in the order of one to 3 days.

Also, in the case where a carbon-containing electrode is first wetproofed and then catalyzed using aqueous solutions of noble metal halides, it is necessary to have the halide residue washed out before the electrode can be placed in operation.

Separate operations in which the carbon-containing electrode is first wetproofed followed by catalysis with compounds of Formula A in an organic solvent are not recommended, since the organic solvent used in the catalysis step tends to dissolve the wetproofing agent.

The following illustrative examples are presented:

*Example 1*

A carbon fuel cell electrode 6" x 5" x ¼" thick was soaked for about 5 minutes in a solution of 50 milliliters of paraffin oil and 2 grams palladium acetylacetonate, dissolved in 100 milliliters of benzene. The electrode was then heated in vacuum at about 160° C. overnight. The electrode was then used in an operating fuel cell and was able to produce its rated power output (50 milliamperes per square centimeter) following a break-in period of about two hours.

*Example 2*

A fuel cell electrode 6" x 5" x 35 mils thick and comprising polyethylene-bonded carbon with a nickel backing was soaked for about 5 minutes in a solution of 50 milliliters of paraffin oil and 2 grams of platinum acetylacetonate, dissolved in 100 milliliters of acetone. The electrode was then heated in air at about 120° C. overnight. The electrode was then used in an operating fuel cell and was able to produce its rated power output following a break-in period of a few hours.

*Example 3*

Following the method of Examples 1 and 2, similar results can be obtained using kerosene as the solvent and paraffin wax of melting point 65° C.–100° C. as the wetproofing agent.

*Example 4*

Following the method of Examples 1, 2 and 3, similar results can be obtained using rhodium acetylacetonate, iridium acetylacetonate, or rhodium benzoylacetonate as the noble metal compound.

Another class of noble metal compounds which can be used in the process of this invention either in place of or in admixture with the compounds of Formula A are those represented by the formula:

(B) 

wherein M' represents platinum, palladium, rhodium, iridium, ruthenium or osmium, and G and G' represent hydrocarbon groups at least one of which is pi-bonded to the metal M'. Preferably G and G' contain from 5 to about 10 carbon atoms.

Illustrative compounds of Formula B are the following:

cyclopentadienyl-rhodium-cyclopentadiene,
methylcyclopentadienyl-rhodium-methylcyclopentadiene,
cyclopentadienyl-iridium-cyclopentadiene,
cyclopentadienyl-palladium-cyclopentenyl,
dicyclopentadienyl-ruthenium,
dicyclopentadienyl-osmium,
cyclopentadienyl-rhodium-cycloocta-1,5-diene,
and the like.

The compounds of Formula B and methods for producing them have been described in the chemical literature.

What is claimed is:

1. A process for simultaneously wetproofing and catalyzing a carbon-containing electrode which comprises: (1) contacting said electrode with an organic solvent solution containing both (a) a wetproofing agent for said electrode, and (b) a compound represented by the formula:

(A) 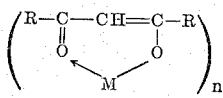

wherein M is selected from the group consisting of platinum, palladium, rhodium and iridium; R is a monovalent hydrocarbon group containing from one to about 10 carbon atoms, and $n$ is an integer equal to the electrovalence of M; and (2) heating said electrode at a temperature sufficiently elevated to decompose said compound of Formula A to the elemental metal M.

2. A process for simultaneously wetproofing and catalyzing a carbon-containing electrode which comprises: (1) contacting said electrode with an organic solvent solution containing both (a) a wetproofing agent for said electrode, and (b) a compound represented by the formula (A) 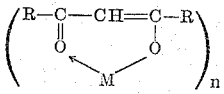

wherein M is selected from the group consisting of platinum, palladium, rhodium and iridium; R is a monovalent hydrocarbon group free of aliphatic unsaturation and containing from one to about 10 carbon atoms, $n$ is 2 when M is platinum or palladium, and $n$ is 3 when M is rhodium or iridium; and (2) heating said electrode at a temperature sufficiently elevated to decompose said compound of Formula A to the elemental metal M.

3. A process for simultaneously wetproofing and catalyzing a carbon-containing fuel cell electrode which comprises: (1) contacting said electrode with an organic solvent solution of (a) a wetproofing agent for said electrode, the concentration of said wetproofing agent in said solution being between about one and about three weight percent, and (b) palladium acetylacetonate in an amount sufficient to provide between about 0.2 and about 5.0 milligrams of palladium per square centimeter of electrode surface, and (2) heating said electrode at a temperature between about 100° C. and 150° C. to decompose said palladium acetylacetonate to palladium metal.

4. A process for simultaneously wetproofing and catalyzing a carbon-containing fuel cell electrode which comprises: (1) contacting said electrode with an organic solvent solution of (a) a wetproofing agent for said electrode, the concentration of said wetproofing agent in said solution being between about one and about three weight percent, and (b) platinum acetylacetonate in an amount sufficient to provide between about 0.2 and about 5.0 milligrams of platinum per square centimeter of electrode surface, and (2) heating said electrode at a temperature between about 100° C. and 150° C. to decompose said platinum acetylacetonate to platinum metal.

5. A process for simultaneously wetproofing and catalyzing a carbon-containing fuel cell electrode which comprises: (1) contacting said electrode with an organic solvent solution of (a) a wetproofing agent for said electrode, the concentration of said wetproofing agent in said solution being between about one and about three weight percent, and (b) rhodium acetylacetonate in an amount sufficient to provide between about 0.2 and about 5.0 milligrams of rhodium per square centimeter of electrode surface, and (2) heating said electrode at a temperature sufficiently elevated to decompose said rhodium acetylacetonate to rhodium metal.

6. The electrode produced by the process of claim 1.

References Cited

UNITED STATES PATENTS

| | | | |
|---|---|---|---|
| 2,669,598 | 2/1954 | Marko et al. | 136—122 |
| 3,252,839 | 5/1966 | Langer et al. | 136—86 |
| 3,256,109 | 6/1966 | Berger | 117—107.2 X |
| 3,098,772 | 7/1963 | Taschek | 136—122 X |

ALLEN B. CURTIS, *Primary Examiner.*

WINSTON A. DOUGLAS, *Examiner.*

N. P. BULLOCH, O. F. CRUTCHFIELD,
*Assistant Examiners.*